United States Patent
Kabse et al.

(10) Patent No.: US 7,641,926 B2
(45) Date of Patent: Jan. 5, 2010

(54) LIQUID-FILLED CHEWING GUM COMPOSITION

(75) Inventors: Kishor Kabse, Morris Plains, NJ (US); Bharat Jani, East Brunswick, NJ (US); François Boudy, Cenon sur Vienne (FR); Yannick Benoit, Prunay en Yvelines (FR); André Busolin, Thenezay (FR)

(73) Assignee: Cadbury Adams USA, LLC, Parsippany, NJ (US)

( * ) Notice: Subject to any disclaimer, the term of this patent is extended or adjusted under 35 U.S.C. 154(b) by 695 days.

(21) Appl. No.: 10/925,822

(22) Filed: Aug. 25, 2004

(65) Prior Publication Data

US 2006/0051456 A1    Mar. 9, 2006

(51) Int. Cl.
A23G 4/20     (2006.01)
(52) U.S. Cl. .......................... 426/3; 426/103; 426/660
(58) Field of Classification Search .................. 426/3, 426/5, 6, 89, 103, 660
See application file for complete search history.

(56) References Cited

U.S. PATENT DOCUMENTS

| | | | |
|---|---|---|---|
| 325,711 A | 9/1885 | Stuckes, Jr. |
| 810,210 A | 1/1906 | Laws |
| 943,945 A | 12/1909 | Lieich |
| 1,771,506 A | 7/1930 | Mustin |
| 1,771,982 A | 7/1930 | Mustin |
| 2,004,957 A | 6/1935 | Messner |
| 2,448,786 A | 9/1948 | Faxon |
| 2,973,273 A | 2/1961 | Curtiss |
| 3,071,476 A | 1/1963 | Werft et al. |
| 3,255,018 A * | 6/1966 | Comollo ..................... 426/4 |
| 3,708,396 A * | 1/1973 | Mitsuhashi et al. ......... 435/158 |
| 3,795,748 A | 3/1974 | Cillario |
| 3,806,290 A | 4/1974 | Graff et al. |
| 3,857,963 A | 12/1974 | Graff et al. |
| 3,894,154 A | 7/1975 | Graff et al. |
| 4,150,161 A | 4/1979 | Rudolph et al. |
| 4,156,740 A | 5/1979 | Glass et al. |
| 4,157,402 A | 6/1979 | Ogawa et al. |
| 4,250,196 A | 2/1981 | Friello |
| 4,252,829 A | 2/1981 | Terrevazzi |
| 4,271,197 A | 6/1981 | Hopkins et al. |
| 4,292,329 A | 9/1981 | Ogawa et al. |
| 4,301,178 A | 11/1981 | Witzel et al. |
| 4,316,915 A | 2/1982 | Friello et al. |
| 4,352,823 A | 10/1982 | Cherukuri et al. |
| 4,352,825 A | 10/1982 | Cherukuri et al. |
| 4,374,858 A | 2/1983 | Glass et al. |
| 4,399,154 A | 8/1983 | Puglia et al. |
| 4,421,773 A | 12/1983 | Akutagawa |
| 4,430,351 A | 2/1984 | Cillario |
| 4,466,983 A | 8/1984 | Cifrese et al. |
| 4,485,118 A | 11/1984 | Carroll et al. |
| 4,513,012 A | 4/1985 | Carroll et al. |
| 4,563,345 A | 1/1986 | Arrick |
| 4,601,907 A | 7/1986 | Knebl et al. |
| 4,614,654 A | 9/1986 | Ream et al. |
| 4,614,658 A | 9/1986 | Wilson et al. |
| 4,642,235 A | 2/1987 | Reed et al. |
| 4,647,450 A | 3/1987 | Peters et al. |
| 4,683,138 A | 7/1987 | Glass et al. |
| 4,707,363 A | 11/1987 | Sato et al. |
| 4,741,905 A | 5/1988 | Huzinec |
| 4,762,719 A | 8/1988 | Forester |
| 4,938,128 A | 7/1990 | Knebl |
| 4,949,630 A | 8/1990 | Knebl |
| 4,971,806 A | 11/1990 | Cherukuri |
| 4,975,288 A | 12/1990 | Hager et al. |
| 4,980,178 A | 12/1990 | Cherukuri et al. |
| 4,997,659 A | 3/1991 | Yatka et al. |
| 5,125,819 A | 6/1992 | Hager et al. |
| 5,156,866 A | 10/1992 | Sato et al. |
| 5,244,887 A | 9/1993 | Straub |
| 5,279,842 A | 1/1994 | Escola Gallart et al. |
| 5,399,365 A | 3/1995 | Yatka et al. |
| 5,425,961 A | 6/1995 | Yatka et al. |
| 5,431,929 A | 7/1995 | Yatka et al. |
| 5,458,892 A | 10/1995 | Yatka et al. |
| 5,498,429 A | 3/1996 | Orlandi et al. |

(Continued)

FOREIGN PATENT DOCUMENTS

EP    0086856 A1    8/1983

(Continued)

OTHER PUBLICATIONS

Warner Lambert Co., "Freshen-Up Peppermint Gum; Freshen-Up Fruit Gum", Aug. 23, 1982, Report No. 010075, http://www.productscan.com/search/fullrecord.cfm?frprt=9657.

Warner Lambert Co., "Freshen-Up Fruit Gum", Feb. 4, 1980, Report No. 000339, http://www.productscan.com/search/fullrecord.cfm?frprt=336.

Warner Lambert Co., "Chewels Sugarless Gum", Oct. 17, 1983, Report No. 018172, http://www.productscan.com/search/fullrecord.cfm?frprt=11085.

Lieberman, Herbert A., Liberman, Leon, "Pharmaceutical Dosage Forms", Tablets, vol. 1, pp. 386-399.

Jackson, E.B., "Cerelose—The Confectionery Industry's Natural Sweetner", Confectionery Manufacture and Marketing, vol. 28, Jun. 1991, No. 6, pp. 20-22.

(Continued)

*Primary Examiner*—Lien Tran
*Assistant Examiner*—Kelly Bekker
(74) *Attorney, Agent, or Firm*—Hoffman & Baron, LLP

(57) ABSTRACT

The present invention provides a chewing or bubble gum composition which includes a liquid fill composition and a gum region which includes a gum base surrounding the liquid fill, wherein the gum region includes a polyol composition including at least one polyol and having a water solubility of less than 72% by weight at 25° C. The composition may also include a coating region which surrounds the gum region.

57 Claims, No Drawings

U.S. PATENT DOCUMENTS

| | | | |
|---|---|---|---|
| 5,502,045 A | 3/1996 | Miettinen et al. | |
| 5,525,360 A | 6/1996 | Yatka et al. | |
| 5,612,070 A | 3/1997 | Yatka et al. | |
| 5,626,892 A | 5/1997 | Kehoe et al. | |
| 5,626,896 A | 5/1997 | Moore et al. | |
| 5,670,163 A | 9/1997 | Cuca et al. | |
| 5,879,728 A | 3/1999 | Graff et al. | |
| 5,952,019 A | 9/1999 | Yatka et al. | |
| 5,955,116 A | 9/1999 | Kehoe et al. | |
| 6,054,144 A | 4/2000 | Burruano et al. | |
| 6,087,353 A | 7/2000 | Stewart et al. | |
| 6,242,019 B1 | 6/2001 | Bell et al. | |
| 6,280,762 B1 | 8/2001 | Bealin-Kelly et al. | |
| 6,280,780 B1 | 8/2001 | Degady et al. | |
| 6,284,291 B1 | 9/2001 | Siecke et al. | |
| 6,306,429 B1 | 10/2001 | Bealin-Kelly | |
| 6,432,441 B1 | 8/2002 | Bealin-Kelly et al. | |
| 6,472,001 B1 | 10/2002 | Bunkers et al. | |
| 6,491,540 B1 | 12/2002 | Barreca | |
| 6,528,102 B1 | 3/2003 | Coyle et al. | |
| 6,558,727 B2 | 5/2003 | Degady et al. | |
| 6,602,518 B2 | 8/2003 | Seielstad et al. | |
| 6,613,346 B2 | 9/2003 | Seielstad et al. | |
| 6,623,266 B2 | 9/2003 | Jani et al. | |
| 6,652,839 B2 | 11/2003 | Barreca | |
| 6,759,079 B2 | 7/2004 | Klug et al. | |
| 6,838,098 B2 | 1/2005 | Bunkers et al. | |
| 6,869,614 B2 | 3/2005 | Barreca | |
| 6,949,264 B1 | 9/2005 | McGrew et al. | |
| 2002/0004083 A1 | 1/2002 | Yatka et al. | |
| 2002/0136812 A1 | 9/2002 | Degady et al. | |
| 2002/0142059 A1 | 10/2002 | Jani et al. | |
| 2003/0059501 A1 | 3/2003 | Rivier | |
| 2003/0077362 A1* | 4/2003 | Panhorst et al. | 426/103 |
| 2003/0138518 A1 | 7/2003 | Kiefer et al. | |
| 2003/0198713 A1 | 10/2003 | Clark et al. | |
| 2004/0037788 A1 | 2/2004 | Barreca | |
| 2004/0037924 A1 | 2/2004 | Jani et al. | |
| 2004/0037925 A1 | 2/2004 | Jani et al. | |
| 2004/0126472 A1 | 7/2004 | Soldami | |
| 2004/0131751 A1 | 7/2004 | Dekker et al. | |
| 2004/0234459 A1 | 11/2004 | Faust et al. | |
| 2005/0260317 A1 | 11/2005 | Cotton et al. | |
| 2005/0260329 A1 | 11/2005 | Yusuf et al. | |
| 2006/0024354 A1 | 2/2006 | Barreca | |

FOREIGN PATENT DOCUMENTS

| | | | |
|---|---|---|---|
| EP | 0806151 A2 | 11/1997 | |
| EP | 0944331 | 9/1999 | |
| EP | 1003475 | 5/2000 | |
| EP | 1004594 A1 | 5/2000 | |
| EP | 1151673 A2 | 11/2001 | |
| EP | 1425976 A1 | 6/2004 | |
| EP | 1699297 A1 | 6/2005 | |
| GB | 2 177 587 | 1/1987 | |
| WO | WO 95/08925 | 4/1995 | |
| WO | WO 97/06695 | 2/1997 | |
| WO | WO 00/06127 | 2/2000 | |
| WO | WO 00/19977 | 4/2000 | |
| WO | WO 01/67884 | 9/2001 | |
| WO | WO 02/056698 | 7/2002 | |
| WO | WO 2006/026298 | 3/2006 | |

OTHER PUBLICATIONS

Jackson, E.B., "Cerelose—Its Role in Improved Confectionery", Confectionery Production, vol. 57, Jan. 1991, No. 1, pp. 79-91.

Hintlain, F., "Filled Hard Candy; Manufacturing Confectioner", vol. 75, Oct. 1995, No. 10, pp. 61-66.

Hume, J., "Notebook of a Practical Confectioner v. Continuation of Recipes for Centres", Confectionery Production, vol. 44, Jan. 1978, pp. 18, 20.

"Centres for High Boilings—Fruit Pulp, Caramel, Treacle or Powder", by Sweetmaker Confectionery Production, vol. 48, Aug. 1982, pp. 344-345.

Long, T., "Producing Centre Filled Hard Candy, Chewing Gum and Toffees", Candy and Snack Industry, vol. 145, Nov. 1980, No. 11, pp. 34, 37.

Gonze, M., "High Purity Erythritol for New Health Food Applications", ZFL, Internationale Zeitschrift Fur Lebensmittel-Tichnik, Marketing, Verpackung und Analytik, vol. 47, 1996, No. 11, pp. 66-68.

McIntyre, M., "Isomalt as an International Sugar Replacer", Food Ingredients and Analysis International, vol. 23, 2001, No. 6, pp. 35-36.

Deis, R., "Polyols in Confectionery", Manufacturing Confectioner, vol. 80, Oct. 2000, No. 10, pp. 53-57.

Hyvoenen, L., et al., "Food Technological Evaluation of Xylitol", Advances in Food Research, vol. 28, 1982, pp. 373-403.

Fritz, Douglas P., "Using Confectionery Equipment to Manufacture Chewing Gum", Manufacturing Confectioner, Nov. 2000, vol. 80, No. 11, pp. 45-48.

Rogers, P., "Helping the Medicine Go Down", vol. 166, 2001, No. 5, pp. 36-40.

"Product Parade", Candy Industry, Dec. 1991, p. 10.

Honpo, Senjakuame, "Orange Pure Sherbet Candy; Lemon Pure Sherbet Candy Manufacturer", International Product Alert, Nov. 1991, vol. 8, No. 21.

* cited by examiner

LIQUID-FILLED CHEWING GUM COMPOSITION

FIELD

The present invention includes compositions for a multi-layer liquid center-filled chewing gum, which maintains its liquidity for a substantial period of time. The individual gum pieces which include the compositions of the present invention include a liquid center surrounded by a gum region and optionally may be further coated with an external coating layer.

BACKGROUND

Liquid or center-filled gum and other confectionery products are in popular demand today. Typically, these products have a solid exterior portion and a soft or liquid-type center. The outer portion can be chewing gum or bubble gum of some type, while the liquid center portion can be a flavored material typically having a syrup-like consistency.

There are also products having a chewing gum or bubble gum core with a hard sugar or sugarless shell on the exterior. These products include, for example well-known pellet gum products sold under the brand names Chiclets®, Clorets®, and Dentyne-Ice®. Both liquid filled and coated gum products are in popular demand.

Conventional center-filled gum products having a liquid-filled center portion, a second layer of chewing gum or bubble gum material surrounding the liquid, and a hard outer shell or coating suffer from undesirable migration of the liquid into the gum base region. This results in a product which is not commercially acceptable. Loss of the center-fill not only impacts the initial organoleptic qualities of the gum, i.e., initial liquid "burst", but also may alter the physical appearance and overall shelf-life stability of the product.

One possible cause of the loss in liquidity of the center-fill is from moisture migration from the center-fill to the surrounding gum layer. This problem has most frequently been addressed by alteration of the center-fill composition.

Patents which included a specifically formulated center-fill composition to overcome the loss of liquidity problem include: U.S. Pat. No. 4,466,983 to Cifrese et al., wherein the center-fill included a hydrogenated starch hydrolysate; U.S. Pat. No. 4,250,196 to Friello which provides a center-fill which includes a combination of water and hydrogenated starch hydrolysate; and U.S. Pat. No. 4,252,829 to Terrevazzi ("Terrevazzi") which discloses a center-fill formulation including propylene glycol and sorbitol.

Other attempts to address the loss of liquidity have provided formulations which are intended to control the water content of the center-fill. Specifically, U.S. Pat. No. 4,683,138 to Glass et al provides a low-moisture liquid center-filled gum composition.

One common factor of the commercially available center-fill gum compositions is the size of the gum piece. On average, the weight of such chewing gum pieces is approximately five grams, such as those disclosed in Terravazzi. Until the present invention, smaller center-filled gum pieces, i.e., less than three grams per piece, have not been made and thus the problems associated with center-filled gum have not existed with such smaller pieces. Smaller gum pieces, such as 2-3 gram sizes and configurations such as pellet gums, have more surface area relative to the liquid-fill and thus, maintaining liquidity of the center-fill and preventing migration into and through the surrounding gum region becomes more critical and challenging.

There is a need for new gum compositions, and particularly hard or crunchy coated gums, which provide the desired hard shell coating layer in combination with a center-fill gum, while resisting loss of liquidity. This is also a need for a center-filled gum, which retains its liquid center during manufacturing and during its shelf-life, and which can be made in a reduced piece-size without loss of the liquid-center fill properties.

SUMMARY

In some embodiments there is a center-fill composition which resists loss of liquidity of the center-fill. In some embodiments, the composition may include a gum region surrounding a center-fill composition, the gum region including a gum base. The gum region may include a polyol composition having a water solubility of less than 72% by weight at 25° C. A hard shell coating which surrounds the gum region may also be included in the composition.

In some embodiments, a gum composition includes a center-fill composition, a gum layer surrounding said center-fill composition, and a coating surrounding said gum layer, wherein the gum layer includes a moisture barrier component including a polyol composition having a densely packed crystalline structure.

In some embodiments, a method of preparing a multi-layer center-fill gum includes the steps of:
 (a) extruding a liquid-filled rope of a chewing gum layer including a polyol which includes maltitol in an amount from about 30% to about 80% by weight of said gum layer;
 (b) sizing said rope;
 (c) feeding said rope into a tablet-forming mechanism;
 (d) cooling said rope;
 (e) forming individual pieces of said liquid-filled rope;
 (f) cooling said individual pieces; and
 (g) coating said individual pieces with a hard coating.

In some embodiments a gum composition may be prepared as follows:
 (a) extruding a liquid-filled rope of a chewing gum layer including a polyol which includes maltitol in an amount from about 30% to about 80% by weight of said gum layer;
 (b) sizing said rope;
 (c) feeding said rope into a tablet-forming mechanism;
 (d) cooling said rope;
 (e) forming individual pieces of said liquid-filled rope;
 (f) cooling said individual pieces; and
 (g) coating said individual pieces with a hard coating.

In some embodiments a gum composition may include a center-fill composition and a gum layer surrounding said center-fill composition, wherein the gum layer includes a polyol composition including maltitol and a polyol selected from erythritol, xylitol, sorbitol, mannitol, isomalt, lactitol and combinations thereof, wherein said maltitol and said other polyol are in sufficient amounts to provide said composition with a water solubility of less than 72% at 25° C.

In some embodiments a composition may include maltitol and a polyol selected from erythritol, xylitol, sorbitol, mannitol, isomalt, lactitol and combinations thereof, wherein said maltitol and said other polyol are in sufficient amounts to provide said composition with a water solubility of less than 72% at 25° C.

In some embodiments a gum composition may include a center-fill layer including greater than zero up to about 10% by weight of said chewing gum composition, a gum layer including from about 55% to about 65% by weight of said chewing gum composition, and a coating including from about 25% to about 35% by weight of said chewing gum composition; wherein said gum composition further includes a gum piece of about three grams or less.

In some embodiments a gum composition may include a center-fill composition, a gum layer surrounding said center-fill composition, a coating layer surrounding said gum layer; wherein said center-fill composition has a water activity less than or equal to said gum layer.

In some embodiments a gum composition may include a center-fill composition, a gum layer surrounding said center-fill composition, a coating layer surrounding said gum layer; wherein said gum layer includes a polyol composition including maltitol; and said gum region further includes a gum base selected from styrene-butadiene copolymers (SBR), polyisobutylene, isobutylene-isoprene copolymers, polyethylene, polyvinyl alcohol (PVA) and combinations thereof.

In some embodiments a gum composition may include a center-fill layer including greater than zero up to about 10% by weight of said chewing gum composition, a gum region including from about 55% to about 65% by weight of said chewing gum composition, and a coating including from about 25% to about 35% by weight of said chewing gum composition;

wherein:

the gum composition further includes a total gum piece weight of about three grams or less;

the gum region includes a polyol compositions from about 40% to about 60% by weight of said gum region; and the polyol composition includes maltitol.

Another embodiment of the present invention may include a multi-region gum product including a liquid-filled region, a gum region and optionally includes a coating region.

In some embodiments is a composition including:

(a) a first region; said first region including a liquid fill;
(b) a second region; said second region surrounding said first region and said second region including a gum base; and
(c) a third region; said third region surrounding said second region;

wherein:

said gum region further includes a polyol composition including at least one polyol having a water solubility of less than 72% by weight at 25° C.

DETAILED DESCRIPTION

As used herein the transitional term "comprising," (also "comprises," etc.) which is synonymous with "including," "containing," or "characterized by," is inclusive or open-ended and does not exclude additional, unrecited elements or method steps, regardless of its use in the preamble or the body of a claim.

As used herein, the terms "bubble gum" and "chewing gum" are used interchangeably and are both meant to include any gum compositions.

As used herein, the terms "liquid-fill" and "center-fill" are used interchangeably and refer to the innermost region of the compositions. The term "center-fill" does not imply symmetry of a gum piece, only that the "center-fill" is within another region of the gum piece. In some embodiments, more than one center-fill or liquid fill may be present.

As used herein, the term "liquid" refers to compositions which will readily flow or maintain fluid properties at room temperature and pressure.

Embodiments described herein provide a multi-component composition which includes at least one liquid fill region and a gum region which includes a gum base. The individual gum piece may also include an outer gum coating or shell, which typically provides a crunchiness to the piece when initially chewed. The individual gum pieces may form a variety of shapes including pellet, tablet, ball, pillow, chunk, stick and slab, among others.

The center-fill gum composition and other compositions described herein may be formed by any technique known in the art which includes the method described by U.S. Pat. No. 6,280,780 to Degady et al. ("Degady") which is herein incorporated by reference in its entirety. Degady describes an apparatus and method for forming center-filled gum pellets. The method includes first extruding a liquid-filled rope of a chewing gum layer and passing the rope through a sizing mechanism including a series of pairs of pulley-shaped roller members. The roller members "size" the rope or strand of gum material such that it leaves the series of rollers with the desired size and shape for entering a tablet-forming mechanism.

The rope is then led into a tablet-forming mechanism including a pair of rotating chain die members which are endless chain mechanisms and both rotate at the same speed by a motor and gear mechanism. Each of the chain mechanisms include a plurality of open curved die groove members which mate and form die cavities in which the pieces of gum material (pellets or tablets) are formed. While Degady is limited to the formation of pellet or tablet shaped pieces, the gum pieces may be of other shapes as described above. The shape of the die groove members may be altered to provided any desired shape.

The gum may optionally be passed through a cooling tunnel either before entering the tablet-forming mechanism, after exiting the tablet-forming mechanism or both. Cooling of the rope prior to entering the tablet-forming mechanism may be beneficial to prevent rebound of the individual pieces and thus an increase in productivity.

The cooled pieces of gum material are then fed into a storage container for conditioning and further processing. At this point, the cooled pieces of gum material could also be fed directly into a coating tunnel mechanism, such as a rotating tunnel mechanism.

Whether the pieces of formed gum material are first stored, transported in a storage container, or fed directly into a coating tunnel or mechanism, the individual pieces of gum material may subsequently be subjected to a conventional sugar or sugarless coating process in order to form a hard exterior shell on the liquid-filled gum material. Coating processes or mechanisms of this type are known. In general, the coating is applied in numerous thin layers of material in order to form an appropriate uniform coated and finished quality surface on the gum products. The hard coating material, which may include sugar, maltitol, sorbitol or any other polyol, including those described herein, and optionally flavoring, is sprayed onto the pellets of gum material as they pass through a coating mechanism or a coating tunnel and are tumbled and rotated therein. In addition, conditioned air is circulated or forced into the coating tunnel or mechanism in order to dry each of the successive coating layers on the formed products.

The coating composition may range from about 2% to about 60%, more specifically, about 20% to about 40% by weight of an individual gum piece which includes a center-fill, a gum region and a coating; even more specifically, from 25% to 35% and still more specifically around 30%. The coating may include sugar or polyol such as maltitol as the primary component, but may also include flavors, colors, etc. as described below in the discussion of the gum region.

The center-filled chewing gum provides resistance from moisture migration from the center-fill to the gum region by modifying both the polyol composition and gum base composition present in the gum region. This is in contrast to the aforementioned conventional approaches and which have not fully addressed the problems associated with manufacturing and shelf-stability of liquid center-filled products.

In some embodiments of the invention, there are included smaller piece-sizes. For example, the smallest conventional piece sizes of commercially available gum are generally in pellet forms. These piece-sizes currently range from about 5-7 grams. In some embodiments liquid filled products have been made using substantially smaller piece sizes, i.e., 50-60% smaller by weight, without loss of liquidity or migration of liquid into the gum region or beyond into the coating. Some inventive embodiments provide a liquid-filled gum piece size range which is greater than about 0.5 grams, more specifically greater than 1.5 grams up to about 3 grams, including the addition of an outer hard coating shell. In addition, in some embodiments a gum piece may include a center-fill, a gum region including a gum base and an outer coating. Such gum pieces may be about 2.2 grams total weight per piece.

It has been discovered that pieces of such small size and particularly with gum shapes or configurations having proportionally more liquid-fill surface area as compared to the weight to the liquid per se, have a greater tendency to lose the liquidity of the center due to the interaction of different factors. While not limited to a single theory, these factors include the small amount of liquid-fill in comparison to the surface of the gum region in which the liquid-fill is in direct contact, the interaction of the type of elastomer with the center-fill (i.e. SBR versus non-SBR), the compatibility of the gum region components with the liquid-fill components, and the potential capillary action of the polyol used in the gum region. For example, the structure of sorbitol, which is customarily used in gum formulations in the United States, does not provide a tightly packed crystalline structure, giving almost a sponge-like appearance. Therefore, in order to provide a center-filled gum piece of less than about 3 grams, the present invention alters the gum and gum base to include a polyol composition having a dense, tightly packed crystalline structure which is unlike the sponge-like structure in conventional sorbitol gum region formulations, in order to provide a center-filled gum piece which resists loss of liquidity.

Gum Region

The gum region, also referred to as the second region in the claims, provides a liquid barrier to surround and prevent the liquid-fill from migration and premature release. One or more cavities can be present in the gum region to house the liquid center-fill. The shape of the cavity will be largely dictated by the final configuration of the chewing gum piece. By selection of the ratio of the desired cavity surface area to the liquid-fill weight, optimization of the reduction in potential liquid-fill migration in to the gum region area can be achieved. This is particularly useful when the gum piece size is desired to be substantially smaller than conventional commercialized gum pieces. In particular, liquid-filled pellet gums having sizes of 2 to 3 grams by weight of the entire gum piece have been successfully made. However, smaller gum pieces, as small as about 0.5 grams are contemplated.

As discussed earlier, some embodiments may incorporate a modified polyol composition including at least one polyol incorporated into the gum region as discussed herein. Moreover, the selection of a non-SBR gum base in the gum region, in combination with the modified polyol composition has been found to be particularly useful in achieving stable liquid-filled chewing gum compositions.

The gum region may include a gum base. The gum base may include any component known in the chewing gum art. For example, the gum region may include elastomers, bulking agents, waxes, elastomer solvents, emulsifiers, plasticizers, fillers and mixtures thereof. Wherein the gum region is included in a three component composition including a center-fill, a gum region and a coating layer, the gum region may comprise from about 40% to about 97%, more specifically from about 55% to about 65% by weight of the chewing gum piece, even more specifically about 62%.

The gum region may also include a specific polyol composition including at least one polyol which is from about 30% to about 80% by weight of said gum region, and specifically from 50% to about 60%. The polyol composition may include any polyol known in the art including, but not limited to maltitol, sorbitol, erythritol, xylitol, mannitol, isomalt, lactitol and combinations thereof. Lycasin which is a hydrogenated starch hydrolysate including sorbitol and maltitol, may also be used.

The amount of the polyol composition or combination of polyols used in the gum region will depend on many factors including the type of elastomers used in the gum base and the particular polyols used. For example, wherein the total amount of the polyol composition is in the range of about 40% to about 65% based on the weight of the gum region, the amount of maltitol may be from about 40% to about 60% in addition to an amount of sorbitol from about 0 up to about 10%, more specifically, an amount of maltitol may be from about 45% to about 55% in combination with sorbitol from about 5% to about 10%.

Maltitol is a sweet, water-soluble sugar alcohol useful as a bulking agent in the preparation of beverages and foodstuffs and is more fully described in U.S. Pat. No. 3,708,396, which disclosure is incorporated herein by reference. Maltitol is made by hydrogenation of maltose which is the most common reducing disaccharide and is found in starch and other natural products.

The disclosure of U.S. Pat. No. 3,708,396 is directed to quantity production of maltitol on a commercial basis by decomposing branched structures of starches into amylosic straight-chain structures by the use of $\alpha$-1,6-glucosidases (isoamylase and pullulanase), the enzymes obtained, for example, by culturing strains of Aerobacter aerogenes and which have specific activities in cutting off the $\alpha$-1,6-glucoside bonds in starch amylopectin, thereby aiding the amylolytic activity of $\beta$-amylase to obtain maltose with a purity of nearly 100 percent, and thereafter reducing the maltose by hydrogenation under high pressure.

By way of illustration, in one experiment (A), a 10 percent sweet potato starch slurry was liquefied by $\alpha$-amylase to D.E. 2.7 percent, and 25 units of $\beta$-amylase was added per gram of the starch and then the mixture was saccharified at 55° C. for 16 hours, while, in another experiment (B), similar saccharification was carried out with the addition of 25 units of $\beta$-amylase and 10 units of $\alpha$-1,6-glucosidase per gram of starch. The compositions of the saccharified solutions that resulted were as tabled below. It was thus noted that when the $\beta$-amylase was used singly (A) the saccharified solution had a maltose content of 69.6 percent but when the $\beta$-amylase was used in combination with the $\alpha$-1,6-glucosidase (B) the maltose content of the resulting solution exceeded 90 percent.

| Saccharified | Composition | | | |
|---|---|---|---|---|
| solution | Maltose | Glucose | Malttriose | Dextrin |
| A | 69.6% | 1.1% | 3.5% | 25.7% |
| B | 90.4% | 0.4% | 1.3% | 7.9% |

In hydrogenating maltose, the maltose was dissolved in water to prepare a 40 to 60 percent aqueous solution and Raney nickel ("N154," trademark of Nikki Kagaku's product) was used as a catalyst in an amount of 8 to 10 percent of the amount of the aqueous solution. Hydrogen was forced in the solution with a pressure of 20 to 100 kg/cm$^2$ the temperature was gradually increased to 80° to 150° C., and thus hydrogenation was carried out. In such a case it sometimes occurs that the pH of the solution drops and the reaction slows down. If such is the case a decomposition of maltose will take place and the yield of maltitol is decreased to about 90 percent with the production of about 8 percent sorbitol. In the experiments, therefore, the pH of the solution was adjusted midway in an effort to improve the yield. However, the yield was only slightly increased to 93 percent. Then, calcium carbonate was added as a moderate neutralizing agent to the starting material maltose in an amount of 0.06 to 0.3 percent on the basis of the latter amount. This resulted in an increase of sorbitol production to 1.6 percent, thus indicating that the decomposition of maltose came to an end, and also an increase of maltitol yield to more than 96 percent. The result was satisfactory in both purity and yield.

Thus, in accordance with the process of the invention described in U.S. Pat. No. 3,708,396, 100 kg. of dehydrated starch in the form of a 3 percent aqueous solution was decomposed with heat, and the branched structure of dextrin was decomposed into a straight-chain structure by the addition of α-1,6-glucosidase, and then saccharification was effected with β-amylase. The starch was thus completely decomposed into maltose, giving 103 kg. of maltose with a purity of 95 percent.

The maltose upon hydrogenation yielded 103.5 kg. of maltitol with a purity of 95 percent.

When the saccharification was effected without the addition of α-1,6-glucosidase but solely with β-amylase, the maltose in the saccharified solution was decomposed leaving α- and β-limit dextrins behind. Fractional estimation of various saccharides by paper chromatography showed that the product contained 50 percent maltose, 30 percent dextrin and 20 percent oligo-saccharide.

In this case, if this saccharified solution is hydrogenated, it affords 102 kg. of a reduction product which is a mixture of sugar alcohols of 50 percent maltitol, oligo-saccharide and dextrin. To obtain high-purity maltitol from this reduction product is difficult because of industrial problems involved.

In order to produce high-purity maltitol without the use of α-1,6-glucosidase, maltose must be taken out of the saccharified solution by alcohol fractionation and must be recrystallized. When the procedure was repeated several times to obtain maltose with the same purity of 95 percent as by the process of the invention, only 3 kg. of 95 percent maltose was produced. The product upon hydrogenation yielded 3 kg. of 95 percent maltitol. Thus, the yield is too low, the production means are not adapted for commercial production, and the product is costly.

As described above, U.S. Pat. No. 3,708,396 permits production of high-purity maltitol with good yield in commercial operation and hence provision of the product at cheap price, which has never been possible with the conventional process.

The process of producing maltose will now be more fully described hereunder. it has been known that maltose is manufactured from starches by liquefying a starch and saccharifying the liquid with the addition of malt (i.e., a mixture of α- and β-amylases). According to this known process, the maltose contents of the saccharified products are at most 50 to 60 percent. The products usually contain large percentages of proteins and limit dextrins. Thus, because of the low maltose contents and high impurity contents, the products involve great difficulties in being purified merely by simple recrystallization procedures.

The factor which makes it impossible to effect complete amylolysis of a starch into maltose in accordance with the conventional process is the production of limit dextrins including α-1,6-glucoside bonds. The invention of U.S. Pat. No. 3,708,396 has been perfected with this in view. More particularly, the invention of U.S. Pat. No. 3,708,396 is directed to the manufacture of highly pure maltose at high yields from starches by selectively decomposing the α-1,6-glucoside bonds contained in amylopectin, a constituent of starch, that is, the α-1,6-glucoside bonds that form the branches of amylopectin having a branched molecular structure, by taking advantage of the specificity of α-1,6-glucosidase, thereby converting the amylopectin to molecules of amylose type consisting solely of straight-chain α-1,4-glucoside bonds which facilitate the activity of β-amylase.

Since β-amylase is an enzyme capable of selectively decomposing the α-1,4-glucoside bonds which are major bonds for the straight chain of starch molecules, it can completely decompose the amylose composed entirely of straight-chain α-1,4-glucoside bonds of starch molecules. For amylopectin, however, it is noted that, while its branched molecular structure whose branches are formed by α1,4glucoside bonds is decomposable by β-amylase, the α-1,6-glucoside bonds that constitute the branches inhibit the decomposition by β-amylase and stop the reaction. This is what is known as the limit dextrin. The invention of U.S. Pat. No. 3,708,396 is characterized in that, in subjecting a starch solution to the action of β-amylase, the α-1,6-glucoside bonds that have the inhibitory action are selectively decomposed by the addition of an α-1,6-glucosidase during or before the reaction so as to permit uninterrupted action of the β-amylase.

U.S. Pat. No. 3,708,396 further includes examples directed to the production of maltitol. Particularly, the hydrogenation of maltose, as described herein below.

1. Maltose as starting material:

The composition of the maltose used was 96.6 percent maltose, 0.4 percent dextrose, and 3.0 percent malt-triose. This decolored and purified maltose was used in the form of a 40 to 60 percent aqueous solution.

2. Reduction catalyst:

Raney nickel ("N154,"trademark of Nikki Kagaku's product) was used as developed in alkali in an amount equivalent to 8 to 10 percent of the amount of the starting material.

3. Reaction conditions:

a. The temperature was between 90° and 100° C., at which two-thirds equivalent of hydrogen was absorbed. Finally the temperature was increased to 125° C. to reach the equilibrium point of absorption.

b. The pressure used ranged from 20 to 100 kg/cm$^2$.

c. Calcium carbonate was added in an amount of 0.3 to 0.05 percent of the amount of the starting material.

Under these conditions, the reaction was carried out with stirring. The compositions of the reaction products obtained with or without the addition of calcium carbonate were as tabled below. On completion of the reaction, the catalyst Raney nickel was removed and each product was concentrated, decolored and purified through ion exchange in the usual manner.

|  | Without CaCO₃ | | With CaCO₃ | | |
|---|---|---|---|---|---|
|  |  | pH not | (% per maltose) | | |
|  | pH adjusted | adjusted | 0.06% | 0.13% | 0.25% |
| pH at the start of the reaction | 4.0-6.2 | 7.0-7.5 | 7.3 | 7.4 | 7.0 |
| pH at the end of the reaction | 4.2-3.7 | 4.3-3.8 | 4.8 | 5.7 | 6.1 |
| Unreacted direct sugar/material (%) | 0.4-1.8 | 6.2-1.2 | 0.63 | 0.28 | 0.25 |
| Reaction time (hr.) | 8-13 | 8-10 | 8 | 8 | 8 |
| Composition: (%) |  |  |  |  |  |
| Sorbitol | 7.3 | 4.6 | 2.1 | 1.8 | 1.6 |
| Maltitol | 90.8 | 93.5 | 95.9 | 96.2 | 96.4 |
| Others | 1.9 | 1.9 | 2.0 | 2.0 | 2.0 |

The polyol composition which may include one or more different polyols which may be derived from a genetically modified organism ("GMO") or GMO free source. For example, the maltitol may be GMO free maltitol or provided by a hydrogenated starch hydrolysate. For the purposes of this invention, the term "GMO-free" refers to a composition that has been derived from process in which genetically modified organisms are not utilized.

Some embodiments may include a polyol composition including maltitol which has a greater crystalline density than sorbitol. Other polyols which exhibit a greater crystalline density than sorbitol include xylitol and mannitol. The greater the crystalline density of the polyol the better the barrier properties are. Specifically, a polyol of a greater crystalline density results in a structure with fewer pores, which provides less surface area for potential moisture or fluid migration into the gum region from the liquid-fill.

Since sugar (sucrose) is generally accepted as the baseline for comparison of sweeteners, including polyols, the polyol composition of some embodiments is described similarly. For example, the polyol composition of may have a sweetness of greater than about 50% of the sweetness of sucrose. More specifically, the polyol composition of the present invention may have sweetness greater than about 70% the sweetness of sucrose.

The polyol composition of some embodiments may also be described in terms of the solubility of the composition. The solubility of the polyol composition will depend on the solubility of the one or more polyols included in the composition. For example, if maltitol is the only polyol included in the polyol composition, the solubility of the polyol composition in water will be about 60% at 25° C.

Blends of different polyols may also be used. Examples of useful polyols are erythritol, lactitol, xylitol, mannitol, maltitol, sorbitol, isomalt, and combinations thereof. Where a blend of more than one polyol is used, the solubility of the polyol composition will depend on a weighted ratio of the amount of the polyol in the blend and the solubility of each individual polyol which is included. For example, a combination of two or more polyols may have a water solubility range of about 60% to about 72%, if it includes maltitol, which has a water solubility of 60% at 25° C., and sorbitol, which has a water solubility of about 72% at 25° C. Other suitable solubility ranges, which depend on the included two or more polyols include the ranges from about 40% to about 60% at 25° C. and 55% to 65% at 25° C. The range of the solubility may vary, depending on the particular polyols used. Alternative suitable solubilities of a polyol combination include those having a solubility less than sucrose (i.e., less than 67%).

The polyol composition may include particles of a variety of sizes. Specifically, the average particle size of the polyol composition ranges from about 30 microns to about 600 microns, more specifically from about 30 microns to about 200 microns.

The amount of the gum base which is present in the gum region may also vary. The gum base may be included in the gum region in an amount from about 25% to about 45% by weight of the gum region. A more specific range of gum base is from about 28% to about 42% by weight of the gum region. Even more specifically, the range may be from about 28% to about 35% or from about 28% to about 30%.

The elastomers (rubbers) employed in the gum base will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and combinations thereof. Examples of synthetic elastomers include, without limitation, styrene-butadiene copolymers (SBR), polyisobutylene, isobutylene-isoprene copolymers, polyethylene, polyvinyl acetate and the like, and combinations thereof.

Additional useful polymers include: crosslinked polyvinyl pyrrolidone, polymethylmethacrylate; copolymers of lactic acid, polyhydroxyalkanoates, plasticized ethylcellulose, polyvinyl acetatephthalate and combinations thereof.

The amount of elastomer employed in the gum base may vary depending upon various factors such as the type of gum base used, the consistency of the gum composition desired and the other components used in the composition to make the final chewing gum product. In general, the elastomer will be present in the gum base in an amount from about 10% to about 60% by weight of the gum region, desirably from about 35% to about 40% by weight.

In some embodiments, the gum base may include wax. It softens the polymeric elastomer mixture and improves the elasticity of the gum base. When present, the waxes employed will have a melting point below about 60° C., and preferably between about 45° C. and about 55° C. The low melting wax may be a paraffin wax. The wax may be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnuba wax, most petroleum waxes, and the like, and mixtures thereof.

In addition to the components set out above, the gum base may include a variety of other ingredients, such as components selected from elastomer solvents, emulsifiers, plasticizers, fillers, and mixtures thereof.

The gum base may contain elastomer solvents to aid in softening the elastomer component. Such elastomer solvents may include those elastomer solvents known in the art, for example, terpinene resins such as polymers of alpha-pinene or beta-pinene, methyl, glycerol and pentaerythritol esters of rosins and modified rosins and gums such as hydrogenated, dimerized and polymerized rosins, and mixtures thereof. Examples of elastomer solvents suitable for use herein may include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifiers which aid in dispersing the immiscible components into a single stable system. The emulsifiers useful in this invention include glyceryl monostearate, lecithin, fatty acid monoglycerides, diglycerides, propylene glycol monostearate, and the like, and mixtures thereof. The emulsifier may be employed in amounts from about 2% to about 15%, and more specifically, from about 7% to about 11%, by weight of the gum base.

The gum base may also include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 20% by weight of the gum base, and more specifically in amounts from about 9% to about 17%, by weight of the gum base.

Plasticizers also include are the hydrogenated vegetable oils and include soybean oil and cottonseed oil which may be employed alone or in combination. These plasticizers provide the gum base with good texture and soft chew characteristics. These plasticizers and softeners are generally employed in amounts from about 5% to about 14%, and more specifically in amounts from about 5% to about 13.5%, by weight of the gum base.

Anhydrous glycerin may also be employed as a softening agent, such as the commercially available United States Pharmacopeia (USP) grade. Glycerin is a syrupy liquid with a sweet warm taste and has a sweetness of about 60% of that of cane sugar. Because glycerin is hygroscopic, the anhydrous glycerin may be maintained under anhydrous conditions throughout the preparation of the chewing gum composition.

In some embodiments, the gum base of this invention may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, calcium sulfate and the like, and mixtures thereof. These fillers or adjuvants may be used in the gum base compositions in various amounts. The amount of filler, may be present in an amount from about zero to about 40%, and more specifically from about zero to about 30%, by weight of the gum base. In some embodiments, the amount of filler will be from about zero to about 15%, more specifically from about 3% to about 11%.

A variety of traditional ingredients may be optionally included in the gum base in effective amounts such as coloring agents, antioxidants, preservatives, flavoring agents, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base.

Some embodiments extend to methods of making the center-fill gum compositions. The manner in which the gum base components are mixed is not critical and is performed using standard techniques and apparatus known to those skilled in the art. In a typical method, an elastomer is admixed with an elastomer solvent and/or a plasticizer and/or an emulsifier and agitated for a period of from 1 to 30 minutes. The remaining ingredients, such as the low melting point wax, are then admixed, either in bulk or incrementally, while the gum base mixture is blended again for 1 to 30 minutes.

The gum composition may include amounts of conventional additives selected from the group consisting of sweetening agents (sweeteners), plasticizers, softeners, emulsifiers, waxes, fillers, bulking agents (carriers, extenders, bulk sweeteners), mineral adjuvants, flavoring agents (flavors, flavorings), coloring agents (colorants, colorings), antioxidants, acidulants, thickeners, medicaments, and the like, and mixtures thereof. Some of these additives may serve more than one purpose. For example, in sugarless gum compositions, a sweetener, such as maltitol or other sugar alcohol, may also function as a bulking agent.

The plasticizers, softening agents, mineral adjuvants, waxes and antioxidants discussed above, as being suitable for use in the gum base, may also be used in the chewing gum composition. Examples of other conventional additives which may be used include emulsifiers, such as lecithin and glyceryl monostearate, thickeners, used alone or in combination with other softeners, such as methyl cellulose, alginates, carrageenan, xanthan gum, gelatin, carob, tragacanth, locust bean gum, pectin, alginates, galactomannans such as guar gum, carob bean gum, glucomannan, gelatin, starch, starch derivatives, dextrins and cellulose derivatives such as carboxy methyl cellulose, acidulants such as malic acid, adipic acid, citric acid, tartaric acid, fumaric acid, and mixtures thereof, and fillers, such as those discussed above under the category of mineral adjuvants.

In some embodiments, the gum region may also contain a bulking agent. Suitable bulking agents may be water-soluble and include sweetening agents selected from, but not limited to, monosaccharides, disaccharides, polysaccharides, sugar alcohols, and mixtures thereof; randomly bonded glucose polymers such as those polymers distributed under the tradename POLYDEXTROSE by Pfizer, Inc., Groton, Conn.; isomalt (a racemic mixture of alpha-D-glucopyranosyl-1,6-mannitol and alpha-D-glucopyranosyl-1,6-sorbitol manufactured under the tradename PALATINIT by Suddeutsche Zucker), maltodextrins; hydrogenated starch hydrolysates; hydrogenated hexoses; hydrogenated disaccharides;

minerals, such as calcium carbonate, talc, titanium dioxide, dicalcium phosphate; celluloses; and mixtures thereof.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof.

Suitable sugar alcohol bulking agents include sorbitol, xylitol, mannitol, galactitol, maltitol, and mixtures thereof.

Suitable hydrogenated starch hydrolysates include those disclosed in U.S. Pat. Nos. 3,356,811, 4,279,931 and various hydrogenated glucose syrups and/or powders which contain sorbitol, hydrogenated disaccharides, hydrogenated higher polysaccharides, or mixtures thereof. Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. Mixtures of hydrogenated starch hydrolysates, such as LYCASIN, a commercially available product manufactured by Roquette Freres of France, and HYSTAR, a commercially available product manufactured by Lonza, Inc., of Fairlawn, N.J., are also useful.

The sweetening agents used may be selected from a wide range of materials including water-soluble sweeteners, water-soluble artificial sweeteners, water-soluble sweeteners derived from naturally occurring water-soluble sweeteners, dipeptide based sweeteners, and protein based sweeteners, including mixtures thereof. Without being limited to particular sweeteners, representative categories and examples include:

(a) water-soluble sweetening agents such as dihydrochalcones, monellin, steviosides, glycyrrhizin, dihydroflavenol, and sugar alcohols such as sorbitol, mannitol, maltitol, and L-aminodicarboxylic acid aminoalkenoic acid ester amides, such as those disclosed in U.S. Pat. No. 4,619,834, which disclosure is incorporated herein by reference, and mixtures thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and mixtures thereof;

(c) dipeptide based sweeteners, such as L-aspartic acid derived sweeteners, such as L-aspartyl-L-phenylalanine methyl ester (Aspartame) and materials described in U.S. Pat. No. 3,492,131, L-alphaaspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, and mixtures thereof;

(d) water-soluble sweeteners derived from naturally occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-f uranoside, or 4,1'-dichloro-4,1'-dideoxygalactosucrose; 1',6'-dichloro 1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideox y-beta-D-fructofuranoside, or 4,6,1',6'-tetrachloro4,6, 1',6'-tetradeoxygalacto-sucrose; and 4,6, 1',6'-tetradeoxy-sucrose, and mixtures thereof; and (e) protein based sweeteners such as thaumaoccous danielli (Thaumatin I and II).

The intense sweetening agents may be used in many distinct physical forms well-known in the art to provide an initial burst of sweetness and/or a prolonged sensation of sweetness. Without being limited thereto, such physical forms include free forms, such as spray dried, powdered, beaded forms, encapsulated forms, and mixtures thereof.

Desirably, the sweetener is a high intensity sweetener such as aspartame, sucralose, and acesulfame potassium (Ace-K).

In general, an effective amount of sweetener may be utilized to provide the level of sweetness desired, and this amount may vary with the sweetener selected. The amount of sweetener may be present in amounts from about 0.001% to about 3%, by weight of the gum composition, depending upon the sweetener or combination of sweeteners used. The exact range of amounts for each type of sweetener may be selected by those skilled in the art.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, spearmint, artificial vanilla, cinnamon derivatives, and various fruit flavors, whether employed individually or in admixture. Flavors may also provide breath freshening properties, particularly the mint flavors when used in combination with the cooling agents, described herein below.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing, publication 1274, pages 63-258, by the National Academy of Sciences, may be used. This publication is incorporated herein by reference. This may include natural as well as synthetic flavors.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, and mixtures thereof.

In some embodiments, the flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well-known.

In some embodiments, the flavoring agents may be used in many distinct physical forms well-known in the art to provide an initial burst of flavor and/or a prolonged sensation of flavor. Without being limited thereto, such physical forms include free forms, such as spray dried, powdered, beaded forms, encapsulated forms, and mixtures thereof.

The amount of flavoring agent employed herein may be a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5%, and more specifically from about 0.1% to about 2%, and even more specifically, from about 0.8% to about 1.8%, by weight of the chewing gum composition.

Coloring agents may be used in amounts effective to produce the desired color. The coloring agents may include pigments which may be incorporated in amounts up to about 6%, by weight of the gum composition. For example, titanium dioxide may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No.2, which is the disodium salt of 5,5-indigotindisulfonic acid. Similarly, the dye known as F.D.& C. Green No. 1 comprises a triphenylmethane dye and is the monosodium salt of 4-[4-(N-ethyl-p-sulfoniumbenzylamino) diphenylmethylene]-[1-(N-ethyl-N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857-884, which text is incorporated herein by reference.

Suitable oils and fats usable in gum compositions include partially hydrogenated vegetable or animal fats, such as coconut oil, palm kernel oil, beef tallow, and lard, among others. These ingredients when used are generally present in amounts up to about 7%, and preferably up to about 3.5%, by weight of the gum composition.

Some embodiments may include a method for preparing the improved chewing gum compositions for the gum region, including both chewing gum and bubble gum compositions. The chewing gum compositions may be prepared using standard techniques and equipment known to those skilled in the art. The apparatus useful in accordance with some embodiments comprises mixing and heating apparatus well known in the chewing gum manufacturing arts, and therefore the selection of the specific apparatus will be apparent to the artisan.

With respect to the center-fill layer, the gum region may have a water activity greater than or equal to the water activity of the center-fill composition. The gum region may have a total moisture content of about 14% by weight of the gum region and more specifically may have a total moisture content from about 9% to about 14% by weight, with a free moisture content of less than about 5%. The center-fill further may have total moisture content including free and bound moisture from about zero up to about 35% be weight of said center-fill. Further, the gum region may have an equilibrium relative humidity (ERH) greater then or equal to the ERH of the center-fill composition.

Liquid-Fill Composition

The center-fill or liquid-fill composition may include any components known in the art for incorporation with a center-fill composition. This may include glycerine in addition to one or more other polyols in amounts greater than zero up to about 20%, more specifically, up to about 10% by weight of the total chewing gum composition, i.e., including a center-fill composition, a gum region and a coating. More desirably, the center-fill is approximately 8% by weight of the total chewing gum composition. The other polyol component includes desirably maltitol, sorbitol, xylitol, or a combination thereof.

The liquid centers may contain those traditional ingredients well known in the chewing gum and confectionery arts, such as flavoring agents, sweetening agents, and the like, and mixtures thereof, as described above. In addition to confectionery additives, the liquid centers may also contain pharmaceutical additives such as medicaments, breath fresheners, vitamins, minerals, caffeine, fruit juices, and the like, and mixtures thereof. The confectionery and pharmaceutical agents may be used in many distinct physical forms well known in the art to provide an initial burst of sweetness and flavor and/or therapeutic activity or a prolonged sensation of sweetness and flavor and/or therapeutic activity. Without being limited thereto, such physical forms include free forms, such as spray dried, powdered, and beaded forms, and encapsulated forms, and mixtures thereof. Illustrative, but not limiting, examples of liquid centers suitable for use in some embodiments include those centers disclosed in U.S. Pat. Nos. 3,894,154, 4,156,740, 4,157,402, 4,316,915, and 4,466, 983, which disclosures are incorporated herein by reference. Specific examples of suitable additional components include taurine, guarana, vitamins, actizol, chlorophyll, Recaldent tooth whitening technology, and retsyn.

The center-fill composition also may include a natural or synthetic gum such as carboxymethylcellulose, pectin, propylene glycol aginate, agar and gum tragacanth. These compositions serve to increase viscosity by reducing the amount of free water in the composition. The viscosity of the center-fill may range from about 300 cp to about 5,000 cp.

Xanthan gum may also be used to increase the viscosity of the center-fill composition. Increasing viscosity of the liquid also helps prevent the liquid from leaking through the gum piece. Xanthan gum is available under the tradename Keltrol® from Signet Chemical Corporation.

Some embodiments extend to methods of making the improved center-filled chewing gum compositions. The improved compositions may be prepared using standard techniques and equipment known to those skilled in the art. The apparatus useful in accordance with the embodiments described herein comprises mixing and heating apparatus well known in the chewing gum manufacturing arts, and therefore the selection of the specific apparatus will be apparent to the artisan Such methods and apparatus are disclosed, for example, in U.S. Pat. Nos. 3,806,290 and 3,857,963, which disclosures are incorporated herein by reference Coating Composition The coating composition, when included in the center-fill compositions, may be applied by any method known in the art including the method described above. The coating composition may be present in an amount from about 2% to about 60%, more specifically from about 25% to about 35% by weight of the total center-filled gum piece, even more specifically about 30% by weight of the gum piece.

The outer coating may be hard or crunchy. Typically, the outer coating may include sorbitol, maltitol, xylitol, isomalt, and other crystallizable polyols; sucrose may also be used. Furthermore the coating may include several opaque layers, such that the chewing gum composition is not visible through the coating itself, which can optionally be covered with a further one or more transparent layers for aesthetic, textural and protective purposes. The outer coating may also contain small amounts of water and gum arabic. The coating can be further coated with wax. The coating may be applied in a conventional manner by successive applications of a coating solution, with drying in between each coat. As the coating dries it usually becomes opaque and is usually white, though other colorants may be added. A polyol coating can be further coated with wax. The coating can further include colored flakes or speckles. If the composition comprises a coating, it is possible that one or more oral care actives can be dispersed throughout the coating. This is especially preferred if one or more oral care actives is incompatible in a single phase composition with another of the actives. Flavors may also be added to yield unique product characteristics.

The coating may also be formulated to assist with increasing the thermal stability of the gum piece and preventing leaking of the liquid fill. In some embodiments, the coating may include a gelatin composition. The gelatin composition may be added as a 40% by weight solution and may be present in the coating composition from about 5% to about 10% by weight of the coating composition, and more specifically about 7% to about 8%. The gel strength of the gelatin may be from about 130 bloom to about 250 bloom.

Other materials may be added to the coating to achieve desired properties. These materials may include without limitations, cellulosics such as carboxymethyl cellulose, gelatin, xanthan gum, gum arabic and polyvinyl alcohol (PVA).

The coating composition may also include a pre-coating which is added to the individual gum pieces prior to an optional hard coating. The pre-coating may include an application of polyvinyl alcohol (PVA). This may be applied as a solution of PVA in a solvent, such as ethyl alcohol. When an outer hard coating is desired, the PVA application may be approximately 3% to 4% by weight of the total coating or about 1% of the total weight of the gum piece (including a liquid-fill, gum region and hard coating).

Additional Components

Additional additives, such as physiological cooling agents, throat-soothing agents, spices, warming agents, tooth-whitening agents, breath-freshening agents, vitamins minerals, caffeine, drugs and other actives may also be included in any or all portions or regions of the chewing gum composition. Such components may be used in amounts sufficient to achieve their intended effects.

With respect to cooling agents, a variety of well known cooling agents may be employed. For example, among the useful cooling agents are included menthol, xylitol, menthane, menthone, ketals, menthone ketals, menthone glycerol ketals, substituted p-menthanes, acyclic carboxamides, substituted cyclohexanamides, substituted cyclohaxane carboxamides, substituted ureas and sulfonamides, substituted menthanols, hydroxymethyl and hydroxymethyl derivatives of p-menthane, 2-mercapto-cyclo-decanone, 2-isoprpanyl-5-methylcyclohexanol, hydroxycarboxylic acids with 2-6 carbon atoms, cyclohexanamides, menthyl acetate, menthyl lactate, menthyl salicylate, N,2,3-trimethyl-2-isopropyl butanamide (WS-23), N-ethyl-p-menthane-3-carboxamide (WS-3), menthyl succinate, 3,1-menthoxypropane 1,2-diol, among others. These and other suitable cooling agents are further described in the following U.S. patents, all of which are incorporated in their entirety by reference hereto: U.S. Pat. Nos. 4,230,688 and 4,032,661 to Rowsell et al.; U.S. Pat. No. 4,459,425 to Amano et al.; U.S. Pat. No. 4,136,163 to Watson et al.; U.S. Pat. No. 5,266,592 to Grub et al.; and U.S. Pat. No. 6,627,233 to Wolf et al. These cooling agents may be present in one or more of the outer gum coatings, the gum region surrounding the liquid fill, the liquid fill per se, or in any combination of those three gum areas. Cooling agents, when used in the outer coating composition for the gum, are generally present in amount of 0.01% to about 1.0%. When used in the other portions of the gum, such as the gum region or the center fill, they may be present in amounts of about 0.001 to about 10% by weight of the total chewing gum piece.

Warming components may be selected from a wide variety of compounds known to provide the sensory signal of warming to the user. These compounds offer the perceived sensation of warmth, particularly in the oral cavity, and often enhance the perception of flavors, sweeteners and other organoleptic components. Among the useful warming compounds included are vanillyl alcohol n-butylether (TK-1000) supplied by Takasago Perfumary Company Limited, Tokyo, Japan, vanillyl alcohol n-propylether, vanillyl alcohol isopropylether, vanillyl alcohol isobutylether, vanillyl alcohol n-aminoether, vanillyl alcohol isoamyleather, vanillyl alcohol n-hexyleather, vanillyl alcohol methylether, vanillyl alcohol ethyleather, gingerol, shogaol, paradol, zingerone, capsaicin, dihydrocapsaicin, nordihydrocapsaicin, homocapsaicin, homodihydrocapsaicin, ethanol, isopropyl alcohol, iso-amylalcohol, benzyl alcohol, glycerine, and combinations thereof.

The sensation of warming or cooling effects may be prolonged with the use of a hydrophobic sweetener as described in U.S. Patent Application Publication 2003/0072842 A1 to Johnson et al. which is incorporated in its entirety herein by reference. For example, such hydrophobic sweeteners include those of the formulae I-XI referenced therein. Perillartine may also be added as described in U.S. Pat. No. 6,159,509 also incorporated in its entirety herein by reference.

The breath freshening agents may include in addition to the flavors and cooling agents described hereinabove, a variety of compositions with odor controlling properties. These may include, without limitation, cyclodextrin and magnolia bark extract. The breath freshening agents may further be encapsulated to provide a prolonged breath freshening effect. Examples of malodor-controlling compositions are included in U.S. Pat. No. 5,300,305 to Stapler et al. and in U.S. Patent Application Publication Nos. 2003/0215417 and 2004/0081713 which are incorporated in their entirety herein by reference As described above, a variety of oral care products may also be included in some embodiments of chewing gums. These may include tooth whiteners, stain removers and anti-calculus agents. Examples of these include, but are not limited to hydrolytic agents including proteolytic enzymes, abrasives such as hydrated silica, calcium carbonate, sodium bicarbonate and alumina, other active stain-removing components such as surface-active agents, such as anionic surfactants such as sodium stearate, sodium palminate, sulfated butyl oleate, sodium oleate, salta of fumaric acid, glycerol, hydroxylated lecithin, sodium lauryl sulfate and chelators such as polyphosphates, which are typically employed in dentifrice compositions as tartar control ingredients. Also included are tetrasodium pyrophosphate and sodium tri-polyphosphate, sodium tripolyphosphate, xylitol, hexametaphosphate, and an abrasive silica. Further examples are included in the following U.S. Patents which are incorporated in their entirety herein by reference: U.S. Pat. No. 5,227,154 to Reynolds, U.S. Pat. No. 5,378,131 to Greenberg and U.S. Pat. No. 6,685,916 to Holme et al.

A variety of drugs, including medications, herbs, and nutritional supplements may also be included in the gum formulations. Examples of useful drugs include ace-inhibitors, anti-anginal drugs, anti-arrhythmias, anti-asthmatics, anti-cholesterolemics, analgesics, anesthetics, anti-convulsants, anti-depressants, anti-diabetic agents, anti-diarrhea preparations, antidotes, anti-histamines, anti-hypertensive drugs, anti-inflammatory agents, anti-lipid agents, anti-manics, anti-nauseants, anti-stroke agents, anti-thyroid preparations, anti-tumor drugs, anti-viral agents, acne drugs, alkaloids, amino acid preparations, anti-tussives, anti-uricemic drugs, anti-viral drugs, anabolic preparations, systemic and non-systemic anti-infective agents, anti-neoplastics, anti-parkinsonian agents, anti-rheumatic agents, appetite stimulants, biological response modifiers, blood modifiers, bone metabolism regulators, cardiovascular agents, central nervous system stimulates, cholinesterase inhibitors, contraceptives, decongestants, dietary supplements, dopamine receptor agonists, endometriosis management agents, enzymes, erectile dysfunction therapies such as sildenafil citrate, which is currently marketed as Viagra®, fertility agents, gastrointestinal agents, homeopathic remedies, hormones, hypercalcemia and hypocalcemia management agents, immunomodulators, immunosuppressives, migraine preparations, motion sickness treatments, muscle relaxants, obesity management agents, osteoporosis preparations, oxytocics, parasympatholytics, parasympathomimetics, prostaglandins, psychotherapeutic agents, respiratory agents, sedatives, smoking cessation aids such as bromocryptine or nicotine, sympatholytics, tremor preparations, urinary tract agents, vasodilators, laxatives, antacids, ion exchange resins, anti-pyretics, appetite suppressants, expectorants, anti-anxiety agents, anti-ulcer agents, anti-inflammatory substances, coronary dilators, cerebral dilators, peripheral vasodilators, psycho-tropics, stimulants, anti-hypertensive drugs, vasoconstrictors, migraine treatments, antibiotics, tranquilizers, anti-psychotics, anti-tumor drugs, anti-coagulants, anti-thrombotic drugs, hypnotics, anti-emetics, anti-nauseants, anti-convulsants, neuromuscular drugs, hyper- and hypo-glycemic agents, thyroid and anti-thyroid preparations, diuretics, anti-spasmodics, terine relaxants, anti-obesity drugs, erythropoietic drugs, anti-asthmatics, cough suppressants, mucolytics, DNA and genetic modifying drugs, and combinations thereof.

Examples of active ingredients contemplated for use in the present invention include antacids, H2-antagonists, and analgesics. For example, antacid dosages can be prepared using the ingredients calcium carbonate alone or in combination with magnesium hydroxide, and/or aluminum hydroxide. Moreover, antacids can be used in combination with H2-antagonists.

Analgesics include opiates and opiate derivatives, such as Oxycontin, ibuprofen, aspirin, acetaminophen, and combinations thereof that may optionally include caffeine.

Other drug ingredients for use in embodiments include anti-diarrheals such as immodium AD, anti-histamines, anti-tussives, decongestants, vitamins, and breath fresheners. Also contemplated for use herein are anxiolytics such as Xanax; anti-psychotics such as clozaril and Haldol; non-steroidal anti-inflammatories (NSAID's) such as ibuprofen, naproxen sodium, Voltaren and Lodine, anti-histamines such as Claritin, Hismanal, Relafen, and Tavist; anti-emetics such as Kytril and Cesamet; bronchodilators such as Bentolin, Proventil; anti-depressants such as Prozac, Zoloft, and Paxil; anti-migraines such as Imigra, ACE-inhibitors such as Vasotec, Capoten and Zestril; anti-Alzheimer's agents, such as Nicergoline; and CaH-antagonists such as Procardia, Adalat, and Calan.

The popular H2-antagonists which are contemplated for use in the present invention include cimetidine, ranitidine hydrochloride, famotidine, nizatidien, ebrotidine, mifentidine, roxatidine, pisatidine and aceroxatidine.

Active antacid ingredients include, but are not limited to, the following: aluminum hydroxide, dihydroxyaluminum aminoacetate, aminoacetic acid, aluminum phosphate, dihydroxyaluminum sodium carbonate, bicarbonate, bismuth aluminate, bismuth carbonate, bismuth subcarbonate, bismuth subgallate, bismuth subnitrate, bismuth subsilysilate, calcium carbonate, calcium phosphate, citrate ion (acid or salt), amino acetic acid, hydrate magnesium aluminate sulfate, magaldrate, magnesium aluminosilicate, magnesium carbonate, magnesium glycinate, magnesium hydroxide, magnesium oxide, magnesium trisilicate, milk solids, aluminum mono-ordibasic calcium phosphate, tricalcium phosphate, potassium bicarbonate, sodium tartrate, sodium bicarbonate, magnesium aluminosilicates, tartaric acids and salts.

A variety of other nutritional supplements may also be included in the gum compositions. Virtually any vitamin or mineral may be included. For example, vitamin A, vitamin C, vitamin D, vitamin E, vitamin K, vitamin $B_6$, vitamin $B_{12}$, thiamine, riboflavin, biotin, folic acid, niacin, pantothenic acid, sodium, potassium, calcium, magnesium, phosphorus, sulfur, chlorine, iron, copper, iodine, zinc, selenium, manganese, chromium, molybdenum, fluorine, cobalt and combinations thereof, may be used.

Examples of nutritional supplements are set forth in U.S. Patent Application Publication Nos. 2003/0157213 A1, 2003/0206993 and 2003/0099741 A1 which is incorporated in their entirety herein by reference.

Various herbs may also be included such as those with various medicinal or dietary supplement properties. Herbs are generally aromatic plants or plant parts that can be used medicinally or for flavoring. Suitable herbs can be used singly or in various mixtures. Commonly used herbs include *Echinacea*, Goldenseal, *Calendula*, *Aloe*, Blood Root, Grapefruit Seed Extract, Black Cohosh, Cranberry, *Ginko Biloba*, St. John's s Wort, Evening Primrose Oil, Yohimbe Bark, Green Tea, Maca, Bilberry, Lutein, and combinations thereof.

The features and advantages of the present invention are more fully shown by the following examples which are provided for purposes of illustration, and are not to be construed as limiting the invention in any way.

EXAMPLES

Examples A-H

TABLE 1

Gum Region Composition

% by weight

| Component | A | B | C | D | E | F | G | H |
|---|---|---|---|---|---|---|---|---|
| Gum base* | 28-42 | 28-42 | 28-42 | 28-42 | 28-42 | 28-42 | 28-42 | 28-42 |
| Lecithin | 0.25 | 0.25 | 0.05 | 0.05 | 0.05 | 0.05 | 0.05 | 0.05 |
| Maltitol | 52-55 | 45-50 | 46-50 | 50-54 | 52-57 | 45-55 | 47-52 | 50-55 |
| Sorbitol | 0 | 0-10 | 5-10 | 0-5 | 0-5 | 5-10 | 0-5 | 0-5 |
| Lycasin | 0 | 0 | 0.25 | 0.25 | 0.25 | 0.25 | 0.25 | 0.25 |
| Flavors | 2.50 | 2.50 | 2.26 | 2.26 | 2.26 | 2.50 | 2.50 | 2.50 |
| Cooling agent | 0.08 | 0.08 | 0 | 0 | 0 | 0.08 | 0.08 | 0.08 |
| Acidulants | 1.2 | 1.2 | 0 | 0 | 0 | 1.2 | 1.2 | 1.2 |
| Intense sweetener | 3.40 | 3.40 | 3.40 | 3.40 | 3.40 | 3.40 | 3.40 | 3.40 |

*gum base may include 3% to 11% by weight of a filler such as, for example, talc, dicalcium phosphate, and calcium carbonate (the amount of filler in the gum base is based on the weight percent of the gum region composition, for example, in the above compositions A-H, if a gum region composition includes 5% filler, the amount of gum base will be 5% less than the range recited in the table, i.e., from 23-37%)

TABLE 2

Liquid-fill Composition

% by weight

| Component | A | B | C | D | E | F | G | H |
|---|---|---|---|---|---|---|---|---|
| Glycerin | 63.00 | 63.00 | 63.00 | 63.00 | 63.00 | 63.00 | 63.00 | 63.00 |
| Lycasin | 29.26 | 29.26 | 29.49 | 29.49 | 29.49 | 29.17 | 29.17 | 29.17 |
| Sorbitol solution | 3.25 | 3.25 | 3.28 | 3.28 | 3.28 | 3.24 | 3.24 | 3.24 |
| Sodium carboxymethyl cellulose | 0.08 | 0.008 | 0.15 | 0.15 | 0.15 | 0.20 | 0.20 | 0.20 |
| Color | 0.004 | 0.004 | 0.0004 | 0.0004 | 0.0004 | 0.004 | 0.004 | 0.004 |
| Flavors | 1.30 | 1.30 | 4.00 | 4.00 | 4.00 | 0.30 | 0.30 | 0.30 |
| Cooling agent | 0.06 | 0.06 | 0.06 | 0.06 | 0.06 | 0.06 | 0.06 | 0.06 |
| Citric acid | 3.00 | 3.00 | 0 | 0 | 0 | 3.00 | 3.00 | 3.00 |
| Intense sweetener | 0.05 | 0.05 | 0.02 | 0.02 | 0.02 | 0.02 | 0.02 | 0.02 |

TABLE 3

Coating Composition

% by weight

| Component | A | B | C | D | E | F | G | H |
|---|---|---|---|---|---|---|---|---|
| Maltitol | 95.02 | 95.02 | 95.36 | 95.36 | 95.36 | 95.02 | 95.02 | 95.02 |
| Bleached gum Arabic | 3.32 | 3.32 | 3.32 | 3.32 | 3.32 | 3.32 | 3.32 | 3.32 |
| Titanium dioxide | 0.36 | 0.36 | 0.36 | 0.36 | 0.36 | 0.36 | 0.36 | 0.36 |
| Flavors | 1.07 | 1.07 | 0.51 | 0.51 | 0.51 | 1.07 | 1.07 | 1.07 |
| Cooling agent | 0.08 | 0.08 | 0.15 | 0.15 | 0.15 | 0.08 | 0.08 | 0.08 |
| Intense sweetener | 0.08 | 0.08 | 0.23 | 0.23 | 0.23 | 0.08 | 0.08 | 0.08 |
| Color | 0 | 0 | 0 | 0 | 0 | 0 | 0 | 0 |
| Candelilla wax | 0.08 | 0.08 | 0.08 | 0.08 | 0.08 | 0.08 | 0.08 | 0.08 |

Gum pieces including three regions: liquid fill, gum region and coating are prepared according to the compositions in Tables 1-3 above with each region according to the corresponding components for compositions A-H.

The compositions for the gum regions are prepared by first combining talc, where present, with the gum base under heat at about 85° C. This combination is then mixed with the maltitol, lecithin and other polyols for six minutes. The flavor blends which include a pre-mix of the flavors and cooling agents are added and mixed for 1 minute. Finally, the acids and intense sweeteners are added and mixed for 5 minutes.

The liquid fill composition is then prepared by first preparing a pre-mix of the sodium carboxymethyl cellulose, glycerine, and polyols. This pre-mix is then combined with the colors, flavors, cooling agents, acids and intense sweeteners and mixed.

The gum region and liquid-fill compositions are then extruded together and formed into tablets by the process described above at paragraphs [0027] to [0030] above. The gum pieces each have a total weight of approximately 2.2 g. In the final gum pieces, the gum region is about 62% by weight, the liquid-fill is about 8% by weight, and the coating is about 30% by weight.

Gum pieces that are prepared by compositions A-H demonstrate no noticeable loss of liquidity of the liquid-fill after accelerated aging at 37° C. for a three week period.

Examples I-P

TABLE 4

Gum Region Composition

% by weight

| Component | I | J | K | L | M | N | O | P |
|---|---|---|---|---|---|---|---|---|
| Gum base - with SBR | 28-42 | 0 | 28-42 | 0 | 28-42 | 0 | 28-42 | 28-42 |
| Gum base - with polyisobutylene | 0 | 28-42 | 0 | 28-42 | 0 | 28-42 | 0 | 0 |
| Lecithin | 0.25 | 0.25 | 0.05 | 0.05 | 0.05 | 0.05 | 0.05 | 0.05 |
| Maltitol | 52-55 | 45-50 | 46-50 | 50-54 | 52-57 | 45-55 | 47-52 | 50-55 |
| Sorbitol | 0 | 0-10 | 5-10 | 0-5 | 0-5 | 5-10.00 | 0-5 | 0-5 |
| Lycasin | 0 | 0 | 0.25 | 0.25 | 0.25 | 0.25 | 0.25 | 0.25 |
| Flavors | 2.50 | 2.50 | 2.26 | 2.26 | 2.26 | 2.5 | 2.5 | 2.5 |
| Cooling agent | 0.08 | 0.08 | 0 | 0 | 0 | 0.08 | 0.08 | 0.08 |
| Acidulants | 1.2 | 1.2 | 0 | 0 | 0 | 1.2 | 1.2 | 1.2 |
| Intense sweetener | 3.40 | 3.40 | 3.40 | 3.40 | 3.40 | 3.40 | 3.40 | 3.40 |
| Caffeine | 0 | 0 | 0 | 14.66 | 0 | 0 | 0 | 0 |
| Vitamin C | 0 | 0 | 0 | 0 | 0 | 7.00 | 0 | 0 |

TABLE 5

Liquid-fill Composition

% by weight

| Component | I | J | K | L | M | N | O | P |
|---|---|---|---|---|---|---|---|---|
| Glycerin | 63.00 | 62.95 | 63.00 | 63.00 | 62.95 | 63.00 | 58.00 | 63.00 |
| Lycasin | 29.26 | 29.26 | 29.49 | 29.49 | 29.49 | 29.17 | 29.17 | 29.17 |
| Sorbitol solution | 3.25 | 3.25 | 3.28 | 3.28 | 3.28 | 3.24 | 3.24 | 3.24 |
| Sodium carboxymethyl cellulose | 0.08 | 0.008 | 0.15 | 0.15 | 0.15 | 0.20 | 0.20 | 0.20 |
| Color | 0.004 | 0.004 | 0.0004 | 0.0004 | 0.0004 | 0.004 | 0.004 | 0.004 |
| Flavors | 1.30 | 1.30 | 4.00 | 4.00 | 4.00 | 0.30 | 0.30 | 0.30 |
| Cooling agent | 0.06 | 0.06 | 0.06 | 0.06 | 0.06 | 0.06 | 0.06 | 0.06 |
| Citric acid | 3.00 | 3.00 | 0 | 0 | 0 | 3.00 | 3.00 | 3.00 |
| Intense sweetener | 0.05 | 0.05 | 0.02 | 0.02 | 0.02 | 0.02 | 0.02 | 0.02 |
| Dextromethorphan hydrobromide | 0 | 0 | 0 | 0 | 0 | 0 | 5 | 0 |
| Xanthan gum | 0 | 0.05 | 0 | 0 | 0.05 | 0 | 0 | 0 |

TABLE 6

Coating Composition

% by weight

| Component | I | J | K | L | M | N | O | P |
|---|---|---|---|---|---|---|---|---|
| Maltitol | 87.52 | 95.02 | 94.36 | 87.86 | 95.36 | 95.02 | 95.02 | 94.02 |
| Bleached gum Arabic | 3.32 | 3.32 | 3.32 | 3.32 | 3.32 | 3.32 | 3.32 | 3.32 |
| Titanium dioxide | 0.36 | 0.36 | 0.36 | 0.36 | 0.36 | 0.36 | 0.36 | 0.36 |
| Flavors | 1.07 | 1.07 | 0.51 | 0.51 | 0.51 | 1.07 | 1.07 | 1.07 |
| Cooling agent | 0.08 | 0.08 | 0.15 | 0.15 | 0.15 | 0.08 | 0.08 | 0.08 |
| Intense sweetener | 0.08 | 0.08 | 0.23 | 0.23 | 0.23 | 0.08 | 0.08 | 0.08 |
| Color | 0 | 0 | 0 | 0 | 0 | 0 | 0 | 0 |
| Candelilla wax | 0.08 | 0.08 | 0.08 | 0.08 | 0.08 | 0.08 | 0.08 | 0.08 |
| Gelatin (40% solution) | 7.5 | 0 | 0 | 7.5 | 0 | 0 | 0 | 0 |
| Polyvinyl alcohol | 0 | 0 | 1.0 | 0 | 0 | 0 | 0 | 1.0 |

Gum pieces including three regions, i.e., liquid fill, gum region and coating, are prepared according to the compositions in Tables 4-6 above, with each region according to the corresponding component for compositions I-P.

The gum pieces of examples I-P are prepared by the same method set forth for examples A-H, above, with changes as set forth below. The individual gum pieces are approximately 2.2 g.

For examples J and M, the addition of xanthan gum may be added to the liquid-fill as part of the sodium carboxymethyl cellulose (CMC) pre-mix which may include CMC, glycerin and polyols.

For examples L and N, the caffeine and vitamin C, respectively, may be added and mixed with the maltitol, lecithin and other polyols.

For example O, the dextromethorphan hydrobromide may be added with the colors, flavors, cooling agents, acids and intense sweeteners prior to mixing.

For examples K and P the polyvinyl alcohol (PVA) may be added as a pre-coating prior to the addition of the remaining coating ingredients. This may form a layer of PVA immediately in contact with and completely surrounding the gum region.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

The invention claimed is:

1. A chewing gum composition that resists loss of liquidity comprising:
   (a) a liquid-fill composition; and
   (b) a gum region surrounding said liquid-fill composition, said gum region comprising a gum base; wherein:
   said gum region further comprises a polyol composition comprising sorbitol in amounts from about 0 to about 10% by weight of said gum region and at least one polyol comprising pure maltitol in amounts of about 40% to about 60% by weight of said gum region,
   wherein after three weeks at 37° C. said chewing gum composition exhibits a reduced loss of said liquid-fill composition into said gum region.

2. The composition of claim 1 further comprising:
   (c) a third region; said third region surrounding a portion of said gum region.

3. The composition of claim 1, wherein said maltitol is genetically modified organism-free (GMO-free) maltitol.

4. The composition of claim 1, wherein said polyol composition is free of sorbitol in said gum region.

5. The composition of claim 2, wherein:
   (a) said liquid-fill composition comprises up to about 20% by weight of said chewing gum composition;
   (b) said gum region comprises from about 40% to about 97% by weight of said chewing gum composition; and
   (c) said third region comprises from about 2% to about 60% by weight of said chewing gum composition.

6. The composition of claim 1, wherein said gum region further comprises a gum base including at least one elastomer selected from the group consisting of natural rubber, styrene-butadiene copolymers (SBR), polyisobutylene, isobutylene-isoprene copolymers, polyethylene, polyvinyl alcohol (PVA), crosslinked polyvinyl pyrrolidone, polymethylmethacrylate, copolymers of lactic acid, polyhydroxyalkanoates, plasticized ethylcellulose, polyvinyl acetatephthalate and combinations thereof.

7. The composition of claim 1, wherein said liquid-fill composition comprises glycerine and one or more polyols.

8. The composition of claim 7, wherein said one or more polyols in said liquid-fill composition comprises maltitol, sorbitol, or a combination of both.

9. The composition of claim 1, wherein said liquid-fill composition comprises a thickener selected from xanthan gum, carboxy methyl cellulose, carrageenan, pectin, alginates, cellulose derivatives, locust bean gum, galactomannans, guar gum, carob bean gum, glucomannan, gelatin, starch, starch derivatives, dextrins and combinations thereof.

10. The composition of claim 2, wherein said third region comprises a member selected from sugar, maltitol, sorbitol, mannitol, xylitol, erythritol, lactitol, isomalt, and combinations thereof.

11. The composition of claim 2, wherein said third region further comprises gelatin.

12. The composition of claim 1, wherein said gum region has a water activity greater than or equal to the water activity of said liquid-fill composition.

13. The composition of claim 1, wherein said gum region has a total moisture content from zero up to about 14% by weight of said gum region.

14. The composition of claim 13, wherein said total moisture content is from about 9% up to 14%.

15. The composition of claim 12, wherein said gum region has a free moisture content of less than about 5% by weight of said gum region.

16. The composition of claim 12, wherein said liquid-fill has a free moisture content of up to about 35% by weight of said liquid-fill.

17. The composition of claim 1, wherein said gum region has an equilibrium relative humidity greater than or equal to an equilibrium relative humidity of said liquid-fill composition.

18. The composition of claim 1, wherein said polyol composition in said gum region has an average particle size from about 30 microns to about 600 microns.

19. The composition of claim 18, wherein said polyol composition in said gum region has an average particle size from about 30 microns to about 200 microns.

20. The composition of claim 1, wherein said composition comprises a shape selected from a pellet, tablet, a ball, a stick, and a slab.

21. The composition of claim 1, wherein said composition is an individual chewing gum piece weighing more than about 0.5 grams to less than about 3 grams.

22. The composition of claim 21, wherein said composition is an individual chewing gum piece weighing more than 1.5 grams to less than about 3.0 grams.

23. The composition of claim 1, further comprising at least one active selected from the group consisting of caffeine, vitamins, tooth-whitening compositions, flavors, remineralization additives, sweeteners, medicaments, anti-oxidants, breath-freshening agents, and combinations thereof.

24. The composition of claim 1, further comprising at least one high intensity sweetener.

25. A chewing gum composition that resists loss of liquidity comprising:
   (a) a liquid fill composition; and
   (b) a gum layer surrounding said liquid fill composition; wherein:
   said gum layer comprises a polyol composition comprising pure maltitol in an amount from about 40% to about 60% by weight of said gum layer and sorbitol in an amount from about 0 to about 10% by weight of said gum layer wherein said maltitol and said sorbitol are in sufficient amounts to provide said composition with a water solubility of less than 72% at 25° C.,
   wherein after three weeks at 37° C. said chewing gum composition exhibits a reduced loss of said liquid-fill composition into said gum region.

26. The gum composition of claim 25, further comprising:
   (c) a coating layer surrounding said gum layer.

27. A chewing gum composition that resists loss of liquidity comprising:
   (a) a liquid fill comprising greater than zero up to about 20% by weight of said chewing gum composition;
   (b) a gum region comprising from about 55% to about 65% by weight of said chewing gum composition, wherein said gum region comprises sorbitol in amount from about 0 to about 10% by weight of said gum region and maltitol in an amount from about 40% to about 60% by weight of said gum region; and
   (c) a coating comprising from about 25% to about 35% by weight of said chewing gum composition;

wherein said gum composition farther comprises an individual gum piece weighing more than about 0.5 grams to less than about three grams, wherein after three weeks at 37° C. said chewing gum composition exhibits a reduced loss of said liquid-fill composition into said gum region.

28. A chewing gum composition that resists loss of liquidity comprising:
(a) a liquid fill composition;
(b) a gum region surrounding said liquid fill composition;
(c) a coating layer surrounding said gum region;
wherein said gum region comprises sorbitol in amount from about 0 to about 10% by weight of said gum region and maltitol in an amount from about 40% to about 60% by weight of said gum region;
wherein said liquid fill composition has a water activity less than or equal to said gum region;
wherein said gum composition further comprises an individual gum piece weighing more than about 0.5 grams to less than about three grams,
wherein after three weeks at 37° C. said chewing gum composition exhibits a reduced loss of said liquid-fill composition into said gum region.

29. A chewing gum composition that resists loss of liquidity comprising:
(a) a liquid fill comprising greater than zero up to about 20% by weight of said chewing gum composition;
(b) a gum region comprising from about 55% to about 65% by weight of said chewing gum composition; and
(c) a coating comprising from about 25% to -about 35% by weight of said chewing gum composition;
wherein:
said gum composition further comprises an individual gum piece weighing more than about 0.5 grams to less than about three grams;
said gum region comprises a polyol compositions from about 40% to about 60% by weight of said gum region; and
said polyol composition comprises maltitol in an amount of about 40% to about 60% by weight of said gum region and sorbitol in an amount of about 0 to about 10% by weight of said gum region,
wherein after three weeks at 370° C. said chewing gum composition exhibits a reduced loss of said liquid-fill composition into said gum region.

30. A chewing gum composition that resists loss of liquidity comprising:
(a) a liquid-fill composition; and
(b) a gum region surrounding said liquid-fill composition, said gum region comprising a gum base, pure maltitol in an amount of about 40% to about 60% by weight of said gum region and sorbitol in an amount of about 0 to about 10% by weight of said gum region;
wherein said gum region has a tree moisture content of up to about 14% by weight of said gum region,
wherein after three weeks at 37° C. said chewing composition exhibits a reduced loss of said liquid-fill composition into said gum region.

31. A chewing gum composition that resists loss of liquidity comprising:
(a) a liquid-fill composition; and
(b) a gum region surrounding said liquid-fill composition, said gum region comprising a gum base, pure maltitol in an amount of about 40% to about 60% by weight of said gum region and sorbitol in an amount of about 0 to about 10% by weight of said gum region;
wherein said gum region has an equilibrium relative humidity greater than or equal to an equilibrium relative humidity of said liquid-fill composition,
wherein after three weeks at 37° C. said chewing gum composition exhibits a reduced loss of said liquid-fill composition into said gum region.

32. A chewing gum composition that resists loss of liquidity comprising:
(a) a first region; said first region comprising a liquid fill;
(b) a second region;
said second region surrounding said first region and
said second region comprising a gum base, maltitol in an amount of about 40% to about 60% by weight of said second region and sorbitol in an amount of about 0 to about 10% by weight of said second region; and
(c) a third region;
said third region surrounding said second region;
wherein:
said composition further comprises an individual gum piece weighing more than about 0.5 grams and less than about three grams,
wherein after three weeks at 37° C. said chewing gum composition exhibits a reduced loss of said liquid-fill composition into said gum region.

33. A chewing gum composition that resists loss of liquidity comprising:
(a) a liquid-fill composition; and
(b) a gum region surrounding said liquid-fill composition, said gum region comprising a gum base;
wherein said gum region further comprises a polyol composition; said polyol composition comprising pure maltitol in an amount of about 40% to about 60% by weight of said gum region and sorbitol in an amount of about 0 to about 10% by weight of said gum region; said polyol composition having a combined solubility less than sorbitol alone,
wherein after three weeks at 37° C. said chewing gum composition exhibits a reduced loss of said liquid-fill composition into said gum region.

34. A chewing gum composition that resists loss of liquidity comprising:
(a) a liquid-fill composition; and
(b) a gum region surrounding said liquid-fill composition, said gum region comprising a gum base;
wherein:
said gum region further comprises a polyol composition having a water solubility of less than 72% by weight at 25° C.;
said polyol composition comprising pure maltitol in an amount of about 40% to about 60% by weight of said gum region and sorbitol in an amount of about 0 to about 10% by weight of said gum region; and
said gum base comprises from about 28% to about 42% by weight of said gum region,
wherein after three weeks at 37° C. said chewing gum composition exhibits a reduced loss of said liquid-fill composition into said gum region.

35. The composition of claim 1, wherein said pure maltitol has a purity of at least 95%.

36. The composition claim 1, wherein said pure maltitol is prepared from purified maltose.

37. The composition of claim 25, wherein said pure maltitol has a purity of at least 95%.

38. The composition claim 25, wherein said pure maltitol is prepared from purified maltose.

39. The composition of claim 26, wherein said composition is a gum piece weighing more than about 0.5 grams to less than about three grams.

40. The composition of claim 27, wherein said maltitol is pure maltitol.

41. The composition of claim 28, wherein said maltitol is pure maltitol.

42. The composition of claim 29, wherein said maltitol is pure maltitol.

43. The composition of claim 30, wherein said pure maltitol has a purity of at least 95%.

44. The composition claim 30, wherein said pure maltitol is prepared from purified maltose.

45. The composition of claim 30, further comprising a coating layer surrounding said gum layer, wherein said composition is a gum piece weighing more than about 0.5 drains to less than about three grams.

46. The composition of claim 31, wherein said pure maltitol has a purity of at least 95%.

47. The composition claim 31, wherein said pure maltitol is prepared from purified maltose.

48. The composition of claim 31, further comprising a coating layer surrounding said gum layer, wherein said composition is a gum piece weighing more than about 0.5 grams to less than about three grams.

49. The composition of claim 32, wherein said maltitol is pure maltitol.

50. The composition of claim 33, wherein said pure maltitol has a purity of at least 95%.

51. The composition claim 33, wherein said pure maltitol is prepared from purified maltose.

52. The composition of claim 33, further comprising a coating layer surrounding said gum layer, wherein said composition is a gum piece weighing more than about 0.5 grams to less than about three grams.

53. The composition of claim 34, wherein said pure maltitol has a purity of at least 95%.

54. The composition claim 34, wherein said pure maltitol is prepared from purified maltose.

55. The composition of claim 34, further comprising a coating layer surrounding said gum layer, wherein said composition is a gum piece weighing more than about 0.5 grams to less than about three grams.

56. The chewing gum composition of claim 1, wherein the polyol composition comprises sorbitol in amounts from about 5% to about 10% by weight of said gum region and at least one polyol comprising maltitol in amounts of about 45% to about 55% by weight of said gum region.

57. The chewing gum composition of claim 1, wherein the polyol composition comprises sorbitol in amounts from about 0% to about 10% by weight of said gum region and at least one polyol comprising maltitol in amounts of about 45% to about 55% by weight of said gum region.

* * * * *

UNITED STATES PATENT AND TRADEMARK OFFICE
CERTIFICATE OF CORRECTION

PATENT NO.      : 7,641,926 B2
APPLICATION NO. : 10/925822
DATED           : January 5, 2010
INVENTOR(S)     : Kishor Kabse et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 695 days.

should read (*) Notice: Subject to any disclaimer, the term of this patent is extended or adjusted under 35 U.S.C. 154(b) by 1,190 days.

On the cover page the printed patent incorrectly reads, "(74) Attorney, Agent, or Firm - Hoffman & Baron, LLP"; the patent should read --(74) Attorney, Agent, or Firm - Hoffmann & Baron, LLP--.

At column 7, line 15, the printed patent reads "...100 kg/cm2 the temperature..."; the patent should read instead as --...100 kg/cm2 while the temperature...--.

At column 9, line 42, the printed patent reads "...composition of may have a sweetness..."; the patent should read instead as --...composition may have a sweetness...--.

At column 27, claim 27, line 1, the printed patent reads "...composition farther comprises..."; the patent should read instead as --...composition further comprises...--.

At column 27, claim 29, line 43, the printed patent reads "...three weeks at 370°C said..."; the patent should read instead as --...three weeks at 37°C said...--.

At column 27, claim 30, line 52, the printed patent reads "...about 40% to about 60% by weight..."; the patent should read instead as --...about 45% to about 55% by weight...--.

At column 29, claim 45, line 3, the printed patent reads "...about 0.5 drains..."; the patent should read instead as --...about 0.5 grams...--.

Signed and Sealed this

Fifteenth Day of June, 2010

David J. Kappos
*Director of the United States Patent and Trademark Office*